(12) United States Patent  (10) Patent No.: US 8,229,402 B2
Kretz et al.  (45) Date of Patent: Jul. 24, 2012

(54) GENERIC PARSER FOR ELECTRONIC DEVICES

(75) Inventors: Martin Kretz, Lund (SE); Gustaf Lööv, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1115 days.

(21) Appl. No.: 11/814,818

(22) PCT Filed: Feb. 2, 2006

(86) PCT No.: PCT/EP2006/050620
§ 371 (c)(1),
(2), (4) Date: Mar. 20, 2008

(87) PCT Pub. No.: WO2006/082219
PCT Pub. Date: Aug. 10, 2006

(65) Prior Publication Data
US 2009/0131115 A1    May 21, 2009

Related U.S. Application Data

(60) Provisional application No. 60/651,852, filed on Feb. 10, 2005.

(30) Foreign Application Priority Data

Feb. 7, 2005 (EP) .................................... 05100828

(51) Int. Cl.
*H04M 3/42* (2006.01)
(52) U.S. Cl. .................................................. 455/414.1
(58) Field of Classification Search .................. 455/427, 455/419, 414.1; 707/1
See application file for complete search history.

(56) References Cited

U.S. PATENT DOCUMENTS

| 4,787,035 A | 11/1988 | Bourne |
| 4,905,138 A | 2/1990 | Bourne |
| 6,377,953 B1 * | 4/2002 | Gawlick et al. ............... 707/701 |
| 6,549,916 B1 * | 4/2003 | Sedlar ..................................... 1/1 |
| 6,549,922 B1 | 4/2003 | Srivastava et al. |
| 6,850,950 B1 | 2/2005 | Clarke et al. |
| 7,027,835 B2 | 4/2006 | Kabatek |

(Continued)

FOREIGN PATENT DOCUMENTS

CN    1440213    9/2003

(Continued)

OTHER PUBLICATIONS

International Preliminary Report on Patentability for corresponding Application No. PCT/EP2006/050620 mailed Aug. 16, 2007.

(Continued)

*Primary Examiner* — Nathan Mitchell
(74) *Attorney, Agent, or Firm* — Renner, Otto, Boisselle & Sklar, LLP

(57) ABSTRACT

Electronic device, comprising a memory for storing data files, and means for accessing information in a data file stored in the memory, including a computer system and computer program code means which, when loaded, makes the computer system execute the steps of: —determining file format for the data file; —accessing a meta descriptor language file adapted to the file format of the data file; —parsing the data file by means of a generic parser using said meta descriptor language file; —extracting meta data from the data file; —presenting information related to the data file from the extracted meta data.

16 Claims, 2 Drawing Sheets

U.S. PATENT DOCUMENTS

| | | | |
|---|---|---|---|
| 7,124,364 B2 * | 10/2006 | Rust et al. | 715/260 |
| 7,137,065 B1 * | 11/2006 | Huang et al. | 715/205 |
| 7,162,691 B1 * | 1/2007 | Chatterjee et al. | 715/205 |
| 7,181,444 B2 | 2/2007 | Porter et al. | |
| 7,246,134 B1 * | 7/2007 | Kitain et al. | 1/1 |
| 7,392,477 B2 * | 6/2008 | Plastina et al. | 715/210 |
| 2002/0073079 A1 | 6/2002 | Terheggen | |
| 2002/0141449 A1 | 10/2002 | Johnson | |
| 2002/0144016 A1 * | 10/2002 | Spicer et al. | 709/321 |
| 2003/0005411 A1 * | 1/2003 | Gerken | 717/120 |
| 2003/0126212 A1 * | 7/2003 | Morris et al. | 709/205 |
| 2003/0144978 A1 | 7/2003 | Zeine | |
| 2004/0039729 A1 | 2/2004 | Boger et al. | |
| 2004/0043763 A1 * | 3/2004 | Minear et al. | 455/419 |
| 2004/0088351 A1 | 5/2004 | Liu et al. | |
| 2004/0103147 A1 | 5/2004 | Flesher et al. | |
| 2004/0103374 A1 | 5/2004 | Chishima | |
| 2004/0225553 A1 * | 11/2004 | Broady et al. | 705/10 |
| 2005/0015389 A1 | 1/2005 | Novak et al. | |
| 2005/0015405 A1 | 1/2005 | Plastina et al. | |
| 2005/0193324 A1 * | 9/2005 | Purple | 715/510 |
| 2006/0025093 A1 * | 2/2006 | Shield et al. | 455/179.1 |

FOREIGN PATENT DOCUMENTS

| | | |
|---|---|---|
| EP | 1 271 350 | 1/2003 |
| JP | 2002-118510 A | 4/2002 |
| JP | 2005-501032 | 1/2005 |
| KR | 2002-0045328 | 6/2002 |
| TW | 410303 | 11/2000 |
| WO | 00/57300 | 9/2000 |
| WO | 00/58817 | 10/2000 |
| WO | 01/82133 | 11/2001 |
| WO | 02/42864 | 5/2002 |

OTHER PUBLICATIONS

PAN 2003-710544; "Automated learning parsing system for syntactic pattern recognition, executes generic parser algorithm based on instructions from microprocessor, for identifying patterns using induced grammar"; IBM (Document 1).

PAN 2003-138602; "Message passing method for message processing system, involves selecting and invoking parser using selected parser for parsing concerned component of message"; IBM (Document 2).

PAN 2000-636466; "Live parsing edit system for mixed language documents has a common parser able to use a Number of language specific parsers and switch between them as necessary" IBM (Document 3).

PAN 1999-311387; "Edit assist for comment blocks includes loading file to edit control to give control to parser and use of parser-set information to display document" IBM (Document 4).

International Search Report for corresponding Application No. PCT/EP2006/050620 mailed Jun. 4, 2006.

Form PCT/ISA/237 for corresponding Application No. PCT/EP2006/050620.

T. Reti et al.; "The DiMaS System for Authoring Communities: Distributing Semantic Multimedia Content on Peer-to-Peer File Sharing Networks"; Proceedings of the 11th Finnish Artificial Intelligence Conference Step 2004; Sep. 1-3, 2004; Vantaa, Finland; vol. 2; pp. 1-15; XP002335014.

Japanese Office Action for corresponding Japanese Application No. 2007-553606 issued Jan. 6, 2011.

* cited by examiner

GENERIC PARSER FOR ELECTRONIC DEVICES

This application is a §371 of International Application No. PCT/EP2006/050620 filed on Feb. 2, 2006, which claims benefit to U.S. Provisional Application No. 60/651,852 filed Feb. 10, 2005, and also claims priority to European Application No. 05100828.2 filed Feb. 7, 2005.

FIELD OF THE INVENTION

The present invention relates generally to the field of electronic devices, in particular portable handheld devices such as mobile phones, which are capable of processing and presenting information. More specifically, the invention relates to the capability of accessing information in different types of data files in such an electronic device.

BACKGROUND

The first commercially attractive cellular telephones or terminals were introduced in the market at the end of the 1980's. Since then, the mobile phone industry has had an enormous development both regarding quality of service and transmission capabilities, as well as the technology for producing advanced communications terminals. A lot of effort has been made in making smaller terminals, with much help from the miniaturisation of electronic components and the development of more efficient batteries. In only a couple of decades the communication systems have gone from analogue to digital, and at the same time the dimensions of the communication terminals have gone from briefcase size to the pocket size phones of today. Today, numerous manufacturers offer pocket-sized terminals with a wide variety of capabilities and services, such as packet-oriented transmission and multiple radio band coverage. Still today, mobile phones are getting smaller and smaller and the size is generally considered to be an important factor for the end customer. The development in electronics has made it possible to miniaturise the components of the terminals, at the same time making the terminals capable of performing more advanced functions and services. The development of new transmission schemes, the so-called $3^{rd}$ generation mobile system also provides the possibility to convey more advanced data to the wireless communication terminals, such as real time video.

The present and coming generations of mobile systems provide capabilities of transmitting and accessing more advanced data. Still, the memory space in the communication terminal will be limited, as will the processor power usable for processing e.g. media data. So, even if it will be possible to access a wider range of different kinds of data, the terminal may be a limiting factor. Developers of media services or commercials are anxious to be able to provide digital information that can be accessed by the consumers through their terminals, without requiring special terminals, extensive memory space, or occupying a lot of time for downloading and presentation.

A problem related to the field of electronic devices is that in order to read or in other ways render a particular data file, a certain software application must be used by the computer system of the electronic device. This problem is particularly relevant for portable electronic devices, which generally are provided with a limited memory space, and therefore typically carries fewer software applications. So, even if electronic devices often handle many kinds of files and data formats, an electronic device will typically recognize far from all types of formats. A chunk of data can contain loads of information but will stay unknown and useless for the user until he or she installs the proper application for handling the data. An application normally registers the data MIME (Multipurpose Internet Mail Extensions) type to the OS (Operating System). After that the application is asked to handle the data when used.

Today there is not much a user can do with an unknown file. It can be stored and moved but one has to install some kind of application to parse the data to know what it is. Some mobile devices can accept incoming, unknown files and store them in its file system. But the user cannot get any more information from the unknown files than the file system allows; typically name, extension and size.

Some State of the art devices can look up the file extension in a remote data base. If found the user will see some static information about the format itself and perhaps a list of vendors/applications that handles it. Windows® has a lookup service that maps a file extension to a Windows application description. So, in effect, the user has to download and install a new application in order to get any information on the file and its contents.

SUMMARY OF THE INVENTION

A general object of the invention is therefore to provide improved means for accessing information related to data files in electronic devices. According to the invention, this object is targeted by providing the possibility of accessing information related to data files, without actually needing a software application for handling the file. Instead, a generic parser is included in the electronic device, which is capable of parsing any data file, given that a matching meta description language file for the file format of the data file is accessible. This way, limited information can be extracted from parsed meta data of the data file, even if the full data may not be extracted from the file. The information obtained this way may e.g. be used by a user of the device for determining whether or not to proceed and obtain an application for being able to render the data file.

According to a first aspect, this object is fulfilled by a method for accessing information in a data file stored in a memory in an electronic device, comprising the steps of:
  determining file format for the data file;
  accessing a meta descriptor language file adapted to the file format of the data file;
  parsing the data file by means of a generic parser using said meta descriptor language file;
  extracting meta data from the data file;
  presenting information related to the data file from the extracted meta data.

In one embodiment the method, prior to the step of accessing the meta descriptor language file, comprises the step of:
  downloading the meta descriptor language file to a file memory in the electronic device from storage means through a data communication network.

In one embodiment the method, prior to the step of downloading the meta descriptor language file, comprises the steps of:
  presenting a selectable option to download the meta descriptor language file to a file memory in the electronic device from storage means through a data communication network;
  initiating download responsive to detecting a user download command.

In one embodiment the method, prior to the step of accessing the meta descriptor language file, comprises the steps of:

detecting an attempt to execute the data file in the electronic device;
establishing that the electronic device holds no accessible application for handling the determined file format.

In one embodiment the method, prior to the step of accessing the meta descriptor language file, comprises the steps of:
detecting an attempt to execute the data file in the electronic device;
establishing that the electronic device holds no meta descriptor language file adapted to the file format;
downloading the meta descriptor language file to a file memory in the electronic device from storage means through a data communication network.

In one embodiment the meta descriptor language file comprises instructions for the generic parser how to binary parse a tag of a data file of the particular data format.

In one embodiment, the step of extracting meta data from the data file comprises the step of:
locating and decoding fields in said data file, identified in said tag.

In one embodiment, the step of presenting information comprises the step of:
presenting the information on a display of the electronic device.

In one embodiment, the electronic device is a mobile phone.

In one embodiment the file format is a media data format, and the extracted meta data of that file includes information on different media pieces of said data file.

In one embodiment the file format is a computer game data format, and the extracted meta data of that file includes information on different game characteristics, such as game levels, game characters, of the game represented by said data file.

According to a second aspect, the object of the invention is fulfilled by an electronic device, comprising a memory for storing data files, and means for accessing information in a data file stored in the memory, including a computer system and computer program code means which, when loaded, makes the computer system execute the steps of:
determining file format for the data file;
accessing a meta descriptor language file adapted to the file format of the data file;
parsing the data file by means of a generic parser using said meta descriptor language file;
extracting meta data from the data file;
presenting information related to the data file from the extracted meta data.

In one embodiment the electronic device is a mobile phone.

In one embodiment the electronic device comprises computer program code means which, when loaded, makes the computer system execute any of the method steps described above with reference to the first aspect of the invention.

In one embodiment the meta descriptor language file comprises instructions for how to binary parse a tag of a data file of the particular data format.

In one embodiment the electronic device comprises computer program code means which, when loaded, makes the computer system execute the step of:
locating and decoding fields in said data file, identified in said tag.

In one embodiment the electronic comprises a display, and computer program code means which, when loaded, makes the computer system present the information on the display.

In one embodiment the file format is a media data format, and the extracted meta data of that file includes information on different media pieces of said data file.

In one embodiment the file format is a computer game data format, and the extracted meta data of that file includes information on different game characteristics of the game represented by said data file.

BRIEF DESCRIPTION OF THE DRAWING

The features and advantages of the present invention will be more apparent from the following description of the preferred embodiments with reference to the accompanying drawings, on which
FIG. 1 schematically illustrates of an electronic device in the embodiment of a mobile phone, in which the invention can be applied.

DETAILED DESCRIPTION OF PREFERRED EMBODIMENTS

The present description relates to the field of handling data files in electronic devices, in particular portable or handheld devices, such as mobile phones, communicators, electronic organisers, smartphones, PDA:s (Personal Digital Assistants), laptop computers etc. It should be noted, though, that the invention is as such not restricted to use in portable electronic devices. Consequently, the present invention is equally applicable to stationary devices, such as desktop computers. Furthermore, it should be emphasised that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawing.

Figure 1:
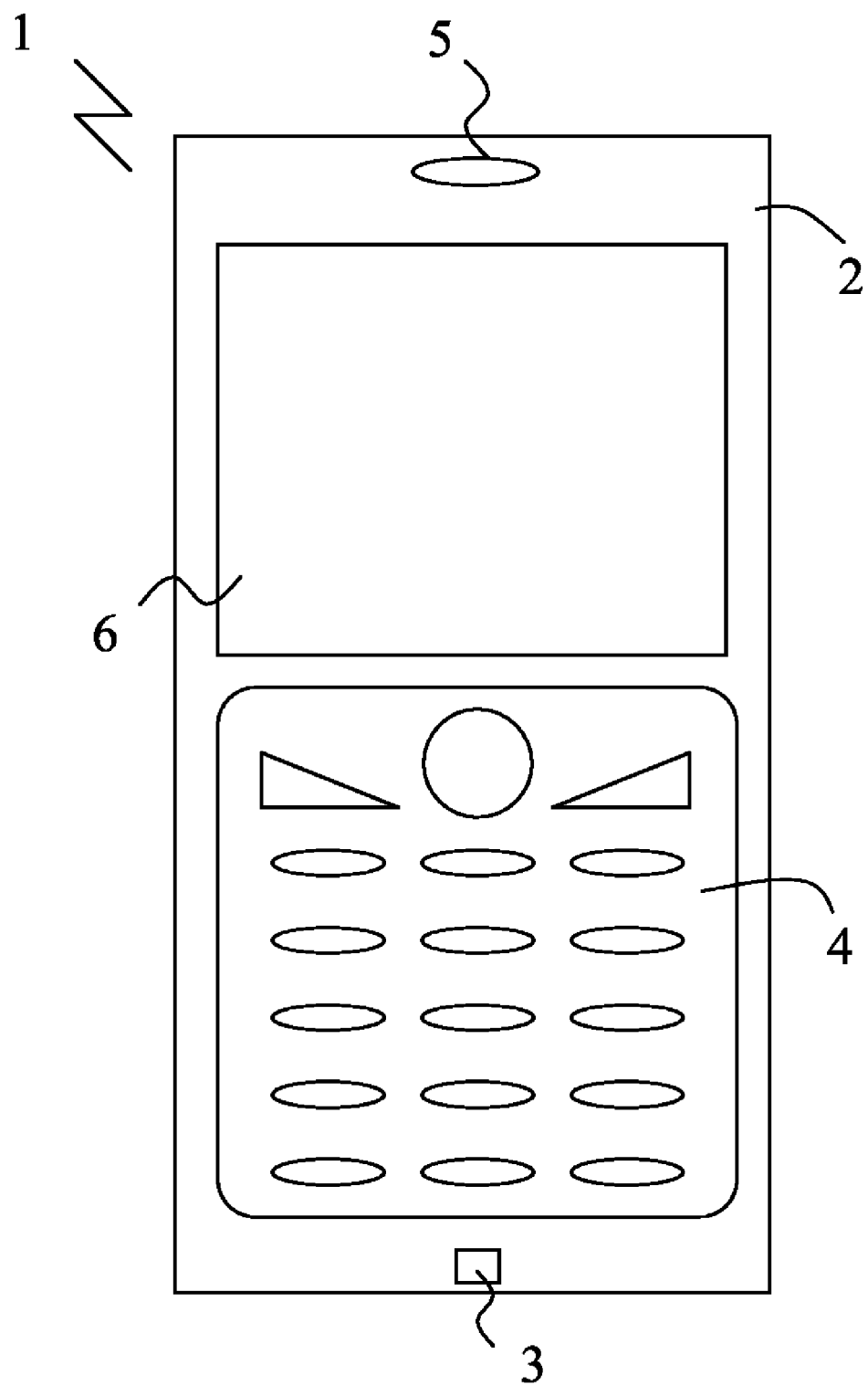

FIG. 1 illustrates an embodiment of an electronic device in accordance with the invention, in the form of a mobile telephone 1. Such a mobile phone 1 is usable for wireless communication with base stations of a cellular network, according to the established art. Examples of communication systems presently used in mobile telephony include GSM (Global System for Mobile communications) and UMTS (Universal Mobile Telecommunications System). Mobile phone 1 typically comprises a support structure, including a chassis and a cover 2, directly or indirectly supporting the other components of the terminal. Mobile phone 1 is devised with a user-input interface, in the displayed embodiment comprising a microphone 3 and a keypad 4. The user input interface may also or comprise a touch-sensitive display in addition to or instead of keypad 4. Furthermore, a user output interface of the mobile phone 1 comprises a loudspeaker 5 and a display 6. All of these features are well known in the prior art. Though not shown in FIG. 1, the mobile phone 1 further includes an antenna, radio transmission and reception electronics, and a power supply preferably in the form of a battery. Furthermore, mobile phone 1 is devised with a computer system, including a microprocessor with associated memory and software.

In many mobile phones of today, as in other types of electronic devices, it is possible to receive and store data files. However, in order to execute the data file, a software application for that purpose is needed. In this context, executing a data file is meant to include opening a file for reading or viewing information, starting a program represented by the data file, such as a computer game, accessing data in the data file for processing or handling, or the like. However, if no application is present in the electronic device, or if such an application cannot be accessed e.g. due to lack of rights, very little information of the data file can be retrieved from the data file as such. Therefore, in order to retrieve information of the data file, the associated software application has to be obtained. For an electronic device such as a mobile phone it may be both complicated and time-consuming to find, access, download, install, setup and run such a software application, which may even have to be paid and registered through suitable channels before it can be used.

The idea behind the present invention is therefore to provide means for obtaining information about a data file, without having to have access to an application necessary to execute the data file. The obtained information about the data file may then be used as a basis for a user of the electronic device to make a decision on what to do with the data file, such as to delete it, send or download it to another device in which it may be executed, or to proceed and obtain the appropriate application software for obtaining access to the data file. In accordance with the invention, a generic parser is included in the electronic device, which can parse any file given that the meta descriptor language, MDL, files matching the data files, are known. The MDL describes how the parser finds different types of meta data inside a data file of a certain format. This way the generic parser, also called the MDL parser, is implemented only once, whereas the MDL files can be downloaded for each new file format and it's meta data is accessible without having to install another application. An advantage with this feature is that an MDL file is typically considerably smaller in size than a full application software, which makes it more suitable for fast download. This is particularly useful for download to electronic devices with limited download bandwidth, or limited memory space. Instead of having to download and store many space-demanding applications, only the ones really wanted may be downloaded.

One example of an embodiment of the present invention may relate to audio files, such as an mp3 file. Such mp3 files have a meta data format, ID3, which is concatenated at the end of the file. In order to find out what data the mp3 file holds, such as song titles and artists, the meta data has to be parsed. To parse that in an electronic device such as a mobile phone, specialized code for interpreting that data may be held in the phone, as is often the case for state of the art mobile phones. However, for an embodiment according to the invention, an MDL parser would instead be included in the mobile phone, for which a matching MDL file for the mime type audio/mp3, say mp3.mdl, is needed. Such an MDL file would probably be installed with the phone, since it is such a common format, but had it been rare, it could be downloadable from some service on the internet. The MDL file contains the information on how to binary parse the ID3 tag, e.g. at offset A the field B is located and is C bytes long encoded in format D. The fields, e.g. artist, song, album, are then extracted from the parser, and presented to the user on a display 6. An example of MDL file contents and syntax for mp3 is given below:

```
<mdl ver="1.0"=>
    <head>
        <mime>audio/mp3</mime>
        <desc>Mpeg Layer 3 audio file</desc>
        <ext>mp3</ext>
    </head>
    <tags>
        <tag id="1">
            <name>Author</name>
            <type>rel</type>
            <pos>
```

-continued

```
                <seek>2</seek>
            </pos>
        </tag>
        <tag id="2">
            <name>Name</name>
            <type>abs</type>
            <length type="given">
                <seek>EOF</seek>
                <seek>-30</seek>
                <bits>8</bits>
                <range>
                    <min>2</min>
                    <max>28</max>
                </range>
            </length>
            <pos>
                <seek>EOF</seek>
                <seek>-30</seek>
            </pos>
        </tag>
    </tags>
</mdl>
```

Figure 2:
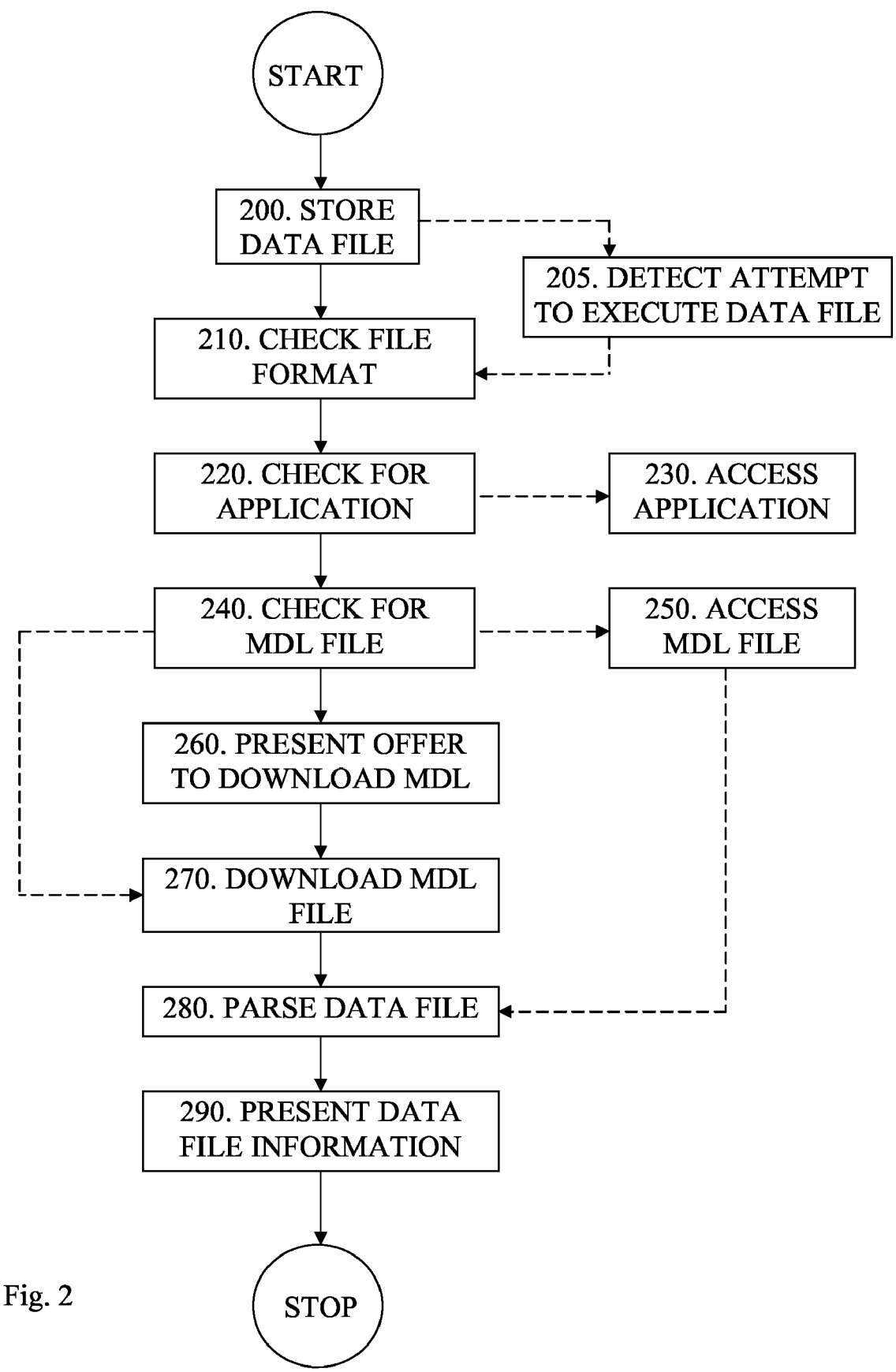
FIG. 2 schematically illustrates a flow chart of an embodiment of the invention.

FIG. 2 illustrates a flow chart for a method according to an embodiment of the invention, and for the sake of clarity it will be referred to as implemented in a mobile phone and used for obtaining information about an mp3 audio file. However, it should be understood that the method as such is applicable to other types of electronic device incorporating a computer system for handling of data files and presenting information to a user of the device.

The method starts by the step 200 of a data file of a particular file format being stored in a data memory of the mobile phone. The data file, in this example an mp3 file, may e.g. have been received in the phone by wireless transmission through a mobile communications network, by download through a cable connected to a computer, or by connection of a memory stick to the phone. The mobile phone is devised with a generic parser, and MDL parser, usable for parsing all received data files, or optionally only those data files for which the computer system of the phone has no matching application. As an example, the data file stored in step 200 is an mp3 file named "greatsongs.mp3".

In a first variant of this embodiment, further processing for obtaining information from the data file is not initiated until an attempt made by a user of the mobile phone to execute or see information about the data file is detected in step 205.

Once such an attempt is detected by the computer system of the mobile phone, the data file is checked by the computer system in step 210 for establishing its file format.

In step 220, the computer system checks if there is an accessible software application in the phone for executing the data file. If that is the case, the application is accessed and the data file is executed in step 230.

If there is no such accessible application, the computer system will instead proceed and check whether there is an MDL file for the established file format accessible in the mobile phone in step 240. If that is the case, the MDL file is accessed in step 250.

If there is no accessible MDL file in the mobile phone for parsing the established file format, the process may proceed in step 260 by presenting, preferably on the display of the mobile phone, an offer to download an MDL file usable for retrieving information about the data file. In one embodiment, such a question or offer may also be provided with an alternative option to download the full application software needed to execute the data file. In the offer, download times and prices, if any, may also be given for the two alternatives.

From step 260, the user may select to download the appropriate MDL file in step 270, by e.g. pressing a soft key indicating that choice on the terminal. Alternatively, the MDL file may be automatically downloaded once it has been established in step 240 that no such MDL file is accessible in the Mobile phone, as indicated by the dashed left side loop in the drawing. MDL file download may be performed over the mobile telecommunication system in which the mobile phone operates, from an MDL file service station connected to the internet.

Once the MDL file for parsing the meta data format of the mp3 file has been obtained by download in step 270, or by access to an MDL file memory in the mobile phone in step 250, the ID3 tag of the data file is parsed by the generic parser.

The fields located in the file "greatsongs.mp3" are then extracted from the generic parser by the computer system, and presented as text on the display of the mobile phone in step 290. The information may e.g. be given as:

1. U2—Gloria
2. Aerosmith—Living on the edge
3. Maroon 5—This love

From this brief but descriptive information, the user of the mobile phone may e.g. decide to either obtain the application needed for executing the mp3 file and actually listen to these songs, or to transmit them to another device.

In a second variant, which is not directly shown in FIG. 2, steps 210, 220 and 240 may be automatically performed by the computer system after step 200, even without an attempt to execute or access information about the data file has been detected. In such a variant, the process is ready to proceed either with accessing an application, accessing an MDL file, or downloading an MDL file, when such an attempt is detected by the computer system.

A benefit with the present invention is that only one piece of software, i.e. the generic parser, is usable for decoding all meta data in all file types using basic operation similar to code, provided a simple meta description language file is accessible. The principles of the present invention have been described in the foregoing by examples of embodiments or modes of operations. However, the invention should not be construed as being limited to the particular embodiments discussed above, which are illustrative rather than restrictive, and it should be appreciated that variations may be made in those embodiments by persons skilled in the art, without departing from the scope of the present invention as defined by the appended claims.

The invention claimed is:

1. A method for accessing information in a data file stored in a memory in an electronic device, comprising the steps of:
    determining a file format for the data file;
    detecting an attempt to execute the data file in the electronic device;
    establishing that the electronic device holds no meta descriptor language file adapted to the file format;
    downloading the meta descriptor language file to a file memory in the electronic device from storage means through a data communication network;
    accessing the meta descriptor language file adapted to the file format of the data file;
    parsing the data file by means of a generic parser using said meta descriptor language file;
    extracting meta data from the data file;
    presenting information related to the data file from the extracted meta data.

2. The method as recited in claim 1, prior to the step of downloading the meta descriptor language file, comprising the steps of:
    presenting a selectable option to download the meta descriptor language file to a file memory in the electronic device from storage means through a data communication network;
    initiating download responsive to detecting a user download command.

3. The method as recited in claim 1, prior to the step of accessing the meta descriptor language file, comprising the steps of:
    detecting an attempt to execute the data file in the electronic device;
    establishing that the electronic device holds no accessible application for handling the determined file format.

4. The method as recited in claim 1, wherein the meta descriptor language file comprises instructions for the generic parser how to binary parse a tag of a data file of the particular data format.

5. The method as recited in claim 4, wherein the step of extracting meta data from the data file comprises the step of:
    locating and decoding fields in said data file, identified in said tag.

6. The method as recited in claim 1, wherein the step of presenting information comprises the step of:
    presenting the information on a display of the electronic device.

7. The method as recited in claim 1, wherein the electronic device is a mobile phone.

8. The method as recited in claim 1, wherein the file format is a media data format, and the extracted meta data of that file includes information on different media pieces of said data file.

9. The method as recited in claim 1, wherein the file format is a computer game data format, and the extracted meta data of that file includes information on different game characteristics of the game represented by said data file.

10. An electronic device, comprising a memory for storing data files, and means for accessing information in a data file stored in the memory, including a computer system and computer program code means which, when loaded, makes the computer system execute the steps of:
    determining a file format for the data file;
    detecting an attempt to execute the data file in the electronic device;
    establishing that the electronic device holds no meta descriptor language file adapted to the file format;
    downloading the meta descriptor language file to a file memory in the electronic device from storage means through a data communication network;
    accessing the meta descriptor language file adapted to the file format of the data file;
    parsing the data file by means of a generic parser using said meta descriptor language file;
    extracting meta data from the data file;
    presenting information related to the data file from the extracted meta data.

11. The electronic device as recited in claim 10, being a mobile phone.

12. The electronic device as recited in claim 10, wherein the meta descriptor language file comprises instructions for how to binary parse a tag of a data file of the particular data format.

13. The electronic device as recited in claim 10, comprising computer program code means which, when loaded, makes the computer system execute the step of:

locating and decoding fields in said data file, identified in said tag.

14. The electronic device as recited in claim 10, further comprising a display, and computer program code means which, when loaded, makes the computer system present the information on the display.

15. The electronic device as recited in claim 10, wherein the file format is a media data format, and the extracted meta data of that file includes information on different media pieces of said data file.

16. The electronic device as recited in claim 10, wherein the file format is a computer game data format, and the extracted meta data of that file includes information on different game modes of the game represented by said data file.

* * * * *